June 12, 1962   T. CRITCHLEY   3,038,160
MECHANICAL HAMMERS FOR PORTABLE NAILING MACHINES
Filed July 14, 1959   3 Sheets-Sheet 1

INVENTOR:
Thomas Critchley

June 12, 1962  T. CRITCHLEY  3,038,160
MECHANICAL HAMMERS FOR PORTABLE NAILING MACHINES
Filed July 14, 1959  3 Sheets-Sheet 2

INVENTOR:
Thomas Critchley

United States Patent Office 3,038,160
Patented June 12, 1962

3,038,160
MECHANICAL HAMMERS FOR PORTABLE
NAILING MACHINES
Thomas Critchley, Ocean Grove, N.J. (Fairview Apts.,
14402 Bayshore Drive, Madeira Beach 8, Fla.)
Filed July 14, 1959, Ser. No. 827,013
5 Claims. (Cl. 1—46)

The present invention relates to mechanical hammers for portable nailing machines, and especially for driving nails by reciprocal compression spring power structures into boards of the tongue and groove variety, such as flooring or other similar woodwork.

The primary object of the instant invention resides in the provision of two pair, or dual set of compression spring impact structures, hereinafter to be known as an initial unit, and an auxiliary unit.

The impact blow of the initial unit to the reciprocal plunger of a nailing machine, would be of sufficient strength to drive a nail to a suitable depth into the woodwork, so that the follow through blow of the auxiliary unit transmitted to the initial unit, would completely drive the nail home and set it.

Another object of the invention resides in the provision of novel and simple co-operating dual impact units, that are highly efficient and inexpensive in operation, eliminating the use of an electric motor, cord, or gearing.

Another object of the invention is to provide dual reciprocal power units, that can be easily and quickly adjusted to the different angles of the nailing machine as may be required for either blind or face nailing.

A further object of the invention resides in providing a novel, manually actuated, ball and socket or toggle joint lever structure, for directly compressing the springs of one unit of a mechanical hammer, and simultaneously through suitable connecting means, to compress the springs of a second unit. Means of releasing the first unit, which in turn will release the second unit, thus imparting two independent and successive blows to the reciprocal plunger of a nailing machine.

Other objects of the invention are accomplished by providing a construction and arrangements of the various parts thereof in the manner hereinafter described.

Still further objects and advantages of the invention will be apparent during the course of the following description.

In the accompanying drawings forming a part of this application and in which like numerals are employed to designate like parts throughout the several views thereof.

Figure 4:
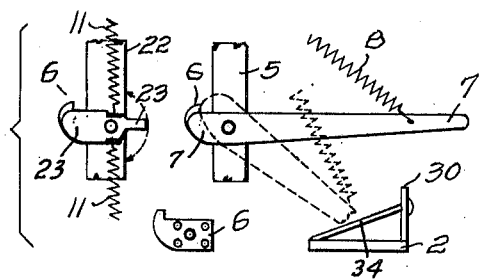

FIG. 4 is a separated detailed view of latch, release lever, and fragmentary section of metal member of auxiliary unit. Latch, release lever, and fragmentary section of metal member of initial unit. Spring controlled catch plate for both units with slideable rods, and detailed view of latch showing rivet holes and U cut.

Figure 5:
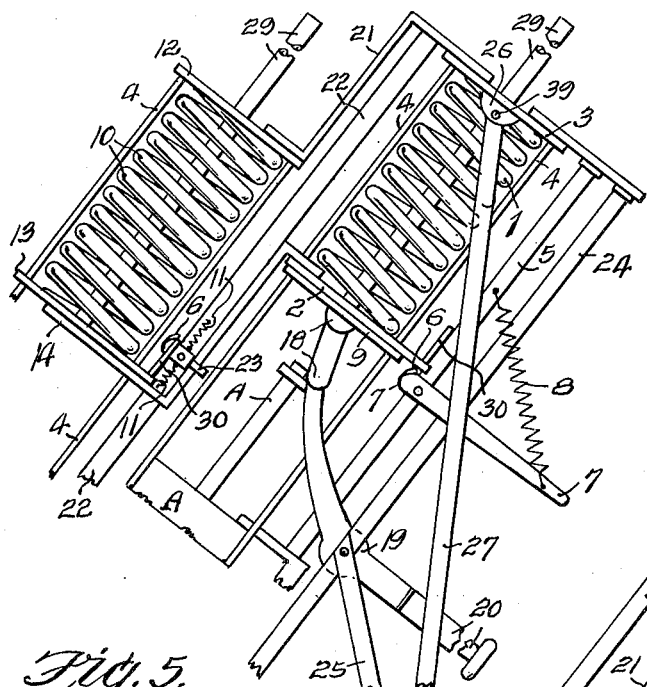

FIG. 5 is a fragmentary view to a larger scale in side elevation of the initial and auxiliary units compressed to the fullest extent, the auxiliary unit in locked position and the initial unit above its locked position.

Figure 6:
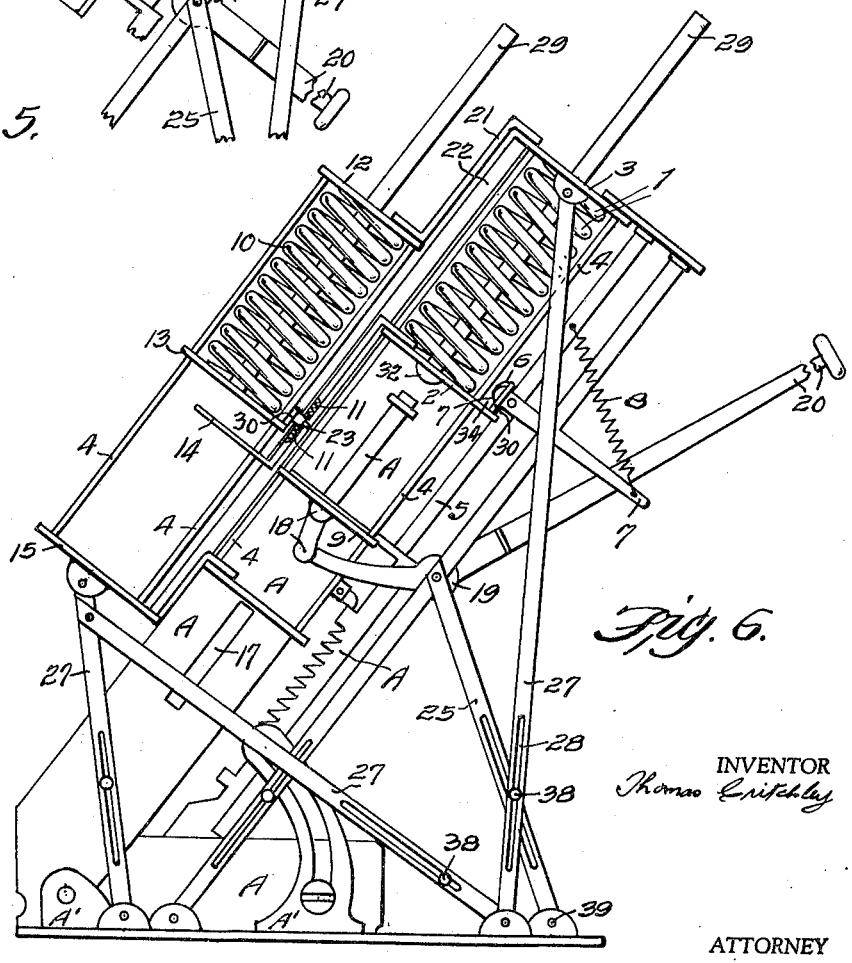

FIG. 6 is a side elevation of the two units locked in a cocked position ready to be released to contact the reciprocal plunger of a nailing machine.

In the drawings, wherein for the purpose of illustration only is shown a preferred embodiment of present invention, the reference character A1 designates a suitable base member having a plurality of upwardly extending lugs 26 and to which base a plunger type nailing machine A having a toothed rack bar is arranged and suitably secured thereto. The upright casing of the nailing machine A is inclined and adjustable to a predetermined angle relation to the base member A1 of the machine.

Figure 1:
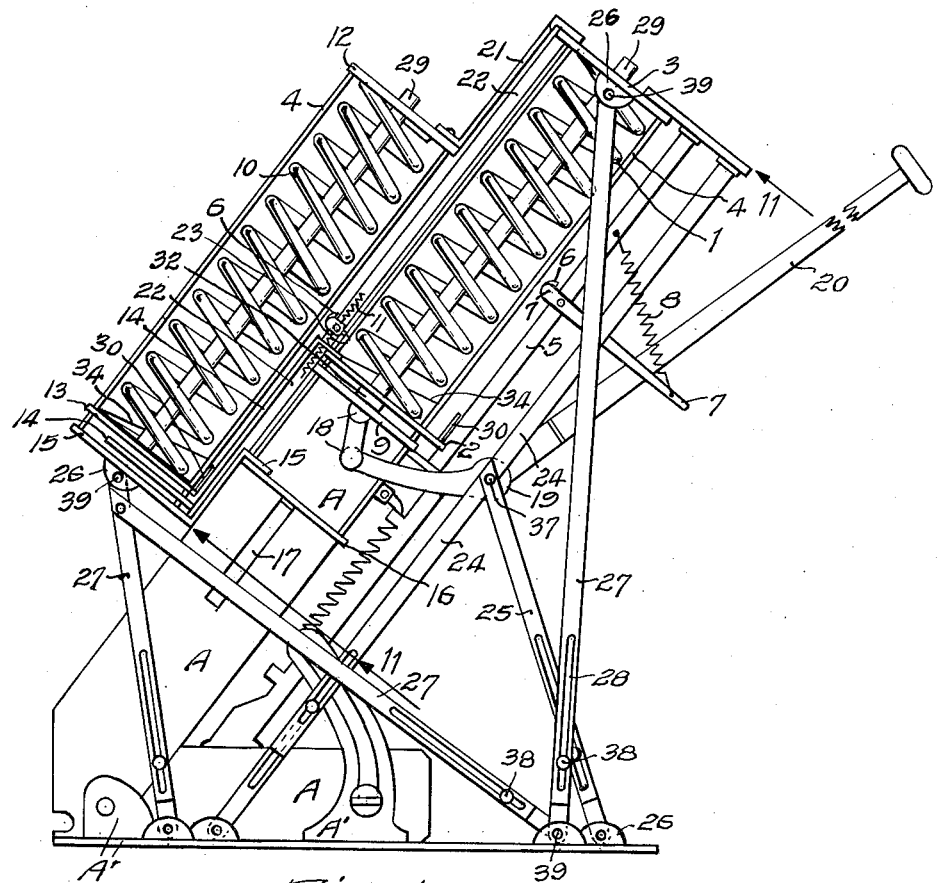
FIG. 1 is a side elevation of the mechanical hammers, the initial and auxiliary units shown in their neutral, lowermost, or power spent positions on their frame structures and the nailing machine adjusted for blind nailing.
Figure 2:
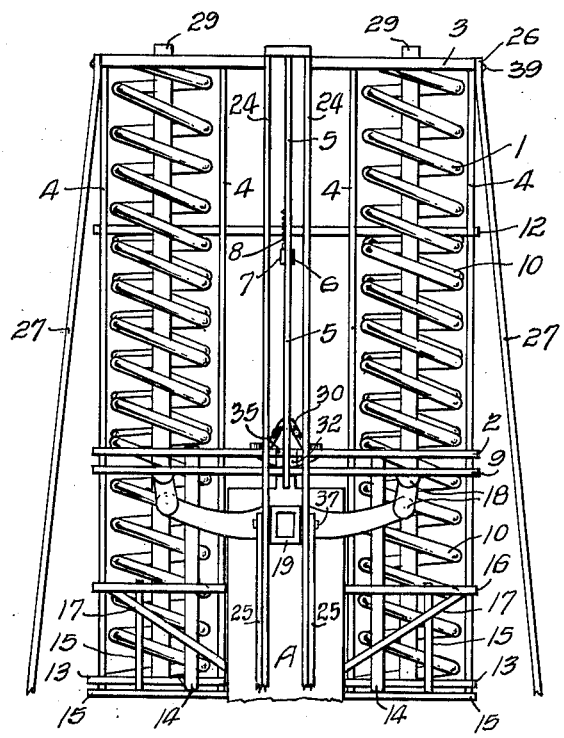
FIG. 2 is a fragmentary view in rear elevation of the initial unit taken on lines II—II of FIG. 1 looking in direction of arrows.

In this preferred embodiment of the invention a general frame structure is employed which includes a flat rectangular top stationary plate 3 having two pair of suitably spaced guide rods 4 fixed to and depending from each end and bored openings through the plate in the center of the square formed by the guide rods 4 at each end of said plate 3. Two rectangular bottom plates 16 one on each side of the nailing machine rest on and are secured to brackets 17 which in turn are secured to the casing of the nailing machine. Each of the plates 16 have two pair of guide rods 4 suitably spaced that depend from plate 3 and are secured in a corresponding position on plate 16 as shown in FIG. 2. A reciprocal plate 9 having a central hammer-head opening is also mounted on guide rods 4, connected to the underside of this plate 9 is a ball and socket or toggle joint combination which in turn is connected to a pronged leverage device 19 having a removable handle 20, handle 20 is also used to hold the machine to the woodwork being nailed. A reciprocal plate 2 is also mounted on guide rods 4 and situated between plates 3 and 9 and neutrally or actively disposed in suitable spaced relation to the adjacent upper face of lifting plate 9. A suitable hammer-head 32 is centrally secured to and depends from plate 2. Secured to the upper face of plate 2 are two reciprocal spring guide rods 29 each rod situated in the center of the square formed by the guide rods 4 at each end of said plate 2, encircling each guide rod 29 is a coiled compression spring 1 seated on the upper face of plate 2 and engages the lower face of plate 3, the upper ends of the spring guide rods 29 reciprocate through the bored openings in the top plate 3 as shown in FIGS. 1, 5, and 6. Hanging from and secured to plate 2 are two legs of a hanger plate 14, this hanger plate 14 hooks under and raises plate 13 of the auxiliary unit when units are being lifted to a cocked position, also acts as a bumper to boost the impact of the initial unit. The stationary plates 16, plate 3, the reciprocal plates 9 and 2, the hanger plate 14, the four pair of guide rods 4, the spring guide rods 29 and the compression springs 1 constitute the initial unit. A second or auxiliary hammer frame structure arranged parallel with and in longitudinal offset relation to the initial unit includes a rectangular and stationary bottom plate 15 hanging from and secured to plates 16 of the initial unit, also a rectangular and stationary plate 12 hanging from and secured to the top plate 3 of the initial unit by a hanger plate 21. This frame structure also includes four pair of guide rods 4 fixed to and depending from each end of plate 12, and rod openings bored through said plate 12 situated in the center of the square formed by the four guide rods 4 at each end of plate 12, the lower ends of these guide rods 4 are secured to plate 15 in a corresponding position. A reciprocal plate 13 is also mounted on guide rods 4 between plates 12 and 15, secured to the upper face of plate 13 are two reciprocal spring guide rods 29, each rod is situated in the center of the square formed by the four guide rods 4 at each end of the said plate 13, encircling each spring guide rod 29 is a coiled compression spring 10 which seats on the upper face of plate 13 and engages the lower face of plate 12, the upper ends of the spring guide rods 29 reciprocate through the bored openings in the top plate 12 as shown in FIGS.

1, 5, and 6. The reciprocal plate 13, the stationary plates 12 and 15, the guide rods 4, the spring guide rods 29 and the compression springs 10 constitute the auxiliary unit.

Figure 3:
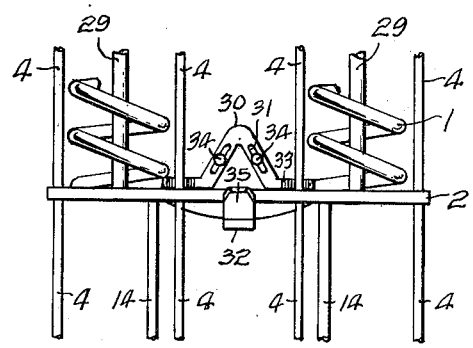
FIG. 3 is a detailed view of the lower reciprocal plate of the initial unit showing the fixed centrally located hammer-head, the spring controlled pivoted catch plate with re-inforcing rods and slots, fragmentary rear views of the guide rods, the compression springs, and the spring guide rods.

The framework embodies a pair of adjustable brace members 27 pivotally connected at the upper ends to lugs 26 projecting from plate 15 by pins 39 and pivotally connected at the lower ends to lugs 26 projecting upwardly on base member A1 by pins 39 as shown in FIGS. 1 and 6. Another pair of adjustable brace members 27 are pivotally connected at their upper ends to fore mentioned brace members 27 and pivotally connected at their lower ends to lugs 26 on base member A1 by pins 39 as shown in FIGS. 1 and 6. Another pair of adjustable brace members 27 are pivotally connected at their upper ends to lugs 26 on plate 3 by pins 39 and pivotally connected at their lower ends to lugs 26 on base member A1 by pins 39. A pair of adjustable brace members 24 depend from an extension of top plate 3 and are pivotally connected at their lower ends to lugs 26 on base member A1 by pins 39, at a suitable distance upwardly from base member A1 openings are bored through brace members 24 to retain pin 37 supporting leverage combination 19 as shown in FIGS. 1, 2, 5 and 6. Still another pair of adjustable brace members 25 are pivotally connected at their upper ends by pin 37 to brace members 24 to stiffen and help support leverage combination 19, and pivotally connected at their lower ends to lugs 26 on base member A1 by pins 39 as shown in FIGS. 1 and 6. All of the brace members are of telescopic construction and secured in desired position by fastening device 38 in slots 28 as shown in FIGS. 1 and 6. A suitable metal member 5 depends from and is secured to the extension of top plate 3 with the lower end secured to the rack bar of nailing machine A as shown in FIGS. 1, 4, and 6, at a suitable distance upwardly from the lower end latch 6 is rigidly secured as shown in FIG. 4, pivotally connected to latch 6 and metal member 5 is release lever 7, release lever 7 is a flat piece of metal with one end of a bull nosed design and the other end tapering to a hand grip, functioning by the downward movement of the hand grip pivoting the bull nosed end in a circular movement thereby forcing the catch plate 30 up and out of the U cut of latch 6, at this point release lever 7 and latch 6 form a rounded outside shape over which catch plate 30 slides downwardly as plate 2 is released from cocked position. Slot 35 on edge of plate 2 is provided to allow for the passing of plate 2 beyond latch 6 on the upward movement as shown in FIGS. 3 and 5. Release lever 7 normally lies in an horizontal position supported by tension spring 8, but is free to move in either direction returning to its normal position either by gravity or the pull of spring 8 as shown in FIG. 4. Another suitable metal member 22 depends from and is secured to plate 3 at its upper end and is secured to plate 15 at its lower end, at a suitable distance from the lower end latch 6 is rigidly secured, pivotally connected to latch 6 and metal member 22 is release lever 23, as shown in FIG. 4. Release lever 23 is a flat piece of metal with one end of a bull nosed design and an extending finger at the other end, functioning by the downward movement of plate 2 striking the finger like extension of release lever 23 thereby causing the same cycle of movement as that performed by release lever 7 explained previously, release lever 23 normally lies in an horizontal position supported by opposed springs 11 but is free to move upwardly to allow plate 2 to pass, and downwardly when struck by plate 2 on its downward movement.

Mechanism for lifting compression springs 1 and 10 into compression and initial and auxiliary units into cocked position consists of an operating handle 20 removably connected to lifting device 19, lifting device 19 is housed between brace members 24, and held in position by pin 37 retained in bored openings in brace members 24 and 25. Projecting outwardly and upwardly from lifting device 19 are two curved prongs connected to a ball and socket or toggle joint combination 18 which in turn is connected to the lifting plate 9 as shown in FIGS. 1, 2, 5, and 6. Operating handle 20 provides the leverage necessary to lift the compression springs into compression and the units into cocked position. Secured to the upper face of plate 2 of the initial unit are two legs of hanger plate 14, hanger plate 14 contacts the underside of plate 13 of the auxiliary unit during the upward movement of plate 2 of the initial unit to a cocked position, thus making it possible for the upward movement of both units simultaneously. A suitably shaped catch plate 30 re-inforced by rods 34 is pivotally mounted on plate 2 as shown in FIG. 3, catch plate 30 hooks on and is supported by latch 6 when mechanical hammers are in cocked position as shown in FIG. 6. Said catch plate 30 has coiled springs 33 at the base thereof as shown in FIG. 3, these coiled springs 33 support the normal vertical position of the catch plate 30 but allow a backward movement when passing latch 6 on the upward movement of plate 2, re-inforcing rods 34 are provided with heads to prevent any forward movement of catch plate 30, rods 34 are anchored to plate 2 at one end and pass through slots 31 with the heads outside. A like catch plate 30 is mounted on plate 13 of the auxiliary unit and performs the same function in the same manner as shown in FIGS. 5 and 6.

*Operation*

The downward movement of handle 20 transmits an upward movement through lifting device 19 to the ball and socket or toggle joint arrangement 18 thereby raising lifting plate 9 guided by rods 4 to contact the underside of plate 2 of the initial unit, the continued downward movement of handle 20 raises plate 2 to a position above latch 6 secured to plate 5 as shown in FIG. 5. On the journey upwards hanger plate 14 secured to plate 2 of the initial unit hooks under plate 13 of the auxiliary unit and raises plate 13 simultaneously with plate 2, at the lifting point where catch plate 30 of the auxiliary unit is in a vertical position just above the U cut of latch 6 secured to metal member 22, and plate 2 a short distance above latch 6 secured to metal member 5 the upward movement of handle 20 will lower plate 13 so that catch plate 30 will drop into the U cut of latch 6 and lock the auxiliary unit in cocked position, further upward movement of handle 20 will lower plate 2 until catch plate 30 of plate 2 falls into U cut of latch 6 secured to metal member 5, The upward movement of handle 20 is continued until lifting plate 9 is in its lowermost position and handle 20 in its highest, in this highest position handle 20 may be used to hold nailing machine close to woodwork being nailed. While the two units were being raised to cocked position the reciprocal spring of the nailing machine was forcing the plunger of said nailing machine upwardly to its highest position a suitable distance below the hammer-head attached to plate 2 of the initial unit. It is obvious to the practical floorman that sharp blows are necessary when striking the plunger of a nailing machine to prevent a backward movement on the part of said machine, hence the play allowed between the several parts involved. The mechanical hammers are now in a cocked position ready to be released to deliver two successive blows to the plunger of the nailing machine and drive a nail into the woodwork.

To release the dual units of the mechanical hammers into operation press downward on release lever 7 of the initial unit, this action causes said lever to pivot on the pin holding it in position, the rounded end of said lever engages catch plate 30 secured to plate 2 and raises catch plate 30 up and out of U cut of latch 6 at the same time closing said U cut, and forming a semicircular edge of release lever 7 and latch 6 over which catch plate 30 slides thus releasing the initial unit into operation, hammer-head 32 secured to plate 2 contacts the plunger of the nailing machine driving the nail a suitable distance into the woodwork at which point plate 2 trips the extended finger of release lever 23 and releases the auxiliary unit into operation, upon being released plate 13 of the auxility unit contacts hanger plate 14 secured to plate 2 of the initial unit thus imparting a second and successive blow to the plunger of the nailing machine with enough impact force to drive the nail its full length into the woodwork and set it.

It is understood that the form of my invention herewith shown and described is to be taken as a preferred example of the same, and that various changes in the shape, size and arrangement of its several parts may be resorted to without departing from the spirit of my invention or scope of the appended claims.

What I claim is:

1. Mechanical hammers for a portable nailing machine comprising a predetermined number of frame members to form a supporting structure, a pair of parallel longitudinal offset reciprocable power impact units arranged on the frame structure, a hammer-head arranged at the lower end of one of the power units and reciprocal therewith, a pair of compression springs included in spaced parallel relation in each power unit, manually actuated means for raising one power impact unit to a predetermined elevated position, means connecting the lower end of the other power impact unit to simultaneously raise the said other unit to a predetermined elevation, means for locking both power impact units in their elevated positions, means for unlocking the first mentioned impact unit to allow the compression springs thereof to become extended to impart an impact against the hammer-head, means for unlocking the other power impact unit to allow the compression springs thereof to become extended just prior to the first mentioned power impact unit spending its impact force against the hammer-head and to successively impart a follow through power impact against the hammer-head.

2. The combination with a nailing machine having a striking plunger, of a hammer-head means for reciprocally supporting the hammer-head, a pair of mechanical hammers, one of which is adapted to co-operate with the other, each of the hammers constructed to deliver a spring power impact, one of the mechanical hammers adapted to impart an initial impact to the hammer-head, the other mechanical hammer adapted to impart a successive impact, the force of which is transmitted to the independently mentioned mechanical hammer to provide a second impact to the hammer-head.

3. In combination, a portable nailing machine having a striking plunger, a frame structure, a reciprocal hammerhead, a pair of reciprocal power impact members mounted on the frame, said impact members including compressible springs adapted for imparting an impact to said hammer-head, a pivoted hand lever, a support for the lever, a toggle arm connected to the hand lever with the lower end of one of the impact members for compressing the aforesaid springs of both impact units, in unison, means for holding the springs in their compressed position, a spring raised tiltable arm having a pawl like head at the inner end adapted to release the tension of the compression springs to impart impact to a hammerhead, which is adapted to impart force to the nailing machine plunger to cause a nail to penetrate woodwork a predetermined depth, and successively driving the nail home through a second impact.

4. In mechanical hammers for portable nailing machines, a base structure, a frame structure, a pair of reciprocal spring actuated impact members mounted on the frame, one of said members having a hammer-head, means of compressing each impact member under independent spring tension, means for releasing the spring tension of the impact members, successively, first releasing the spring tension of the impact member in the path of the hammer-head, and then releasing the spring tension of the other impact member, and means connecting the two impact members for transferring the impact force from the said other impact member to the impact member in the path of the hammer-head.

5. In combination, a base, a portable nailing machine having a reciprocal plunger adjustably arranged in the base, two power impact unit frame structures, adjustable brace members connecting the impact power structures with the base, a compression spring actuated impact unit on one of the two skeleton frame structures, a hammerhead fixed to a reciprocal plate adjacent the lower end of structure midway between the springs thereof, a reciprocal plate included in said frame structure having a central opening therein, and disposed below the above mentioned plate, a hand operated lever, a toggle connection between the lever and the plate having a central opening for manually compressing the spaced compression springs on one of the impact frame structures, a second like power impact structure having two spaced compression springs mounted on the other frame structure, a hanger connection connecting the power impact frame structures, and means for releasing the tension of the two power impact units successively so as to allow one unit to expel its stored up power impact force on the hammer-head, and then to expel the stored up power impact force of the other unit on the hammer-head.

References Cited in the file of this patent

UNITED STATES PATENTS

| | | |
|---|---|---|
| 1,845,617 | Metcalf | Feb. 16, 1932 |
| 2,768,376 | Critchley | Oct. 30, 1956 |